Feb. 9, 1926.　　　　　　　　　　　　　　　　1,572,740
R. MATTICE
METHOD OF AND APPARATUS FOR ELECTRIC WELDING
Filed Oct. 17, 1924

Inventor
Royal Mattice
By Donald A. Rich
Attorney

Patented Feb. 9, 1926.

1,572,740

UNITED STATES PATENT OFFICE.

ROYAL MATTICE, OF BETHLEHEM, PENNSYLVANIA.

METHOD OF AND APPARATUS FOR ELECTRIC WELDING.

Application filed October 17, 1924. Serial No. 744,167.

*To all whom it may concern:*

Be it known that I, ROYAL MATTICE, a citizen of the United States, residing at Bethlehem, in the county of Northampton and State of Pennsylvania, have invented certain new and useful Improvements in Methods of and Apparatus for Electric Welding, of which the following is a specification.

This invention relates to a method of and apparatus for electric welding.

It is the primary object of this invention to provide a method of welding tubular metallic structures such as pipes or the like to form a unitary structure.

It is a further object of this invention to provide a method of welding together, end to end, two structures such as metallic pipes or the like.

A still further object of this invention is to provide a method of welding the ends of two pipes or the like together simultaneously throughout the entire circumference of the ends.

Another object of this invention is to provide a method of repairing a cracked or broken pipe or the like by electric welding.

A still further object of this invention is to provide an electrode holder which will permit the entire circumference of a cracked or broken pipe to be welded simultaneously or which will permit the simultaneous welding of the entire circumference of one end of a pipe or the like to the entire circumference of the end of another pipe or the like.

Other objects and advantages of this invention will be apparent from the following description, taken in conjunction with the accompanying drawings. I desire it understood that this invention is not restricted to the welding of pipes, and that wherever the word "pipes" appears, it refers also to tubular articles generally.

Figure 1:
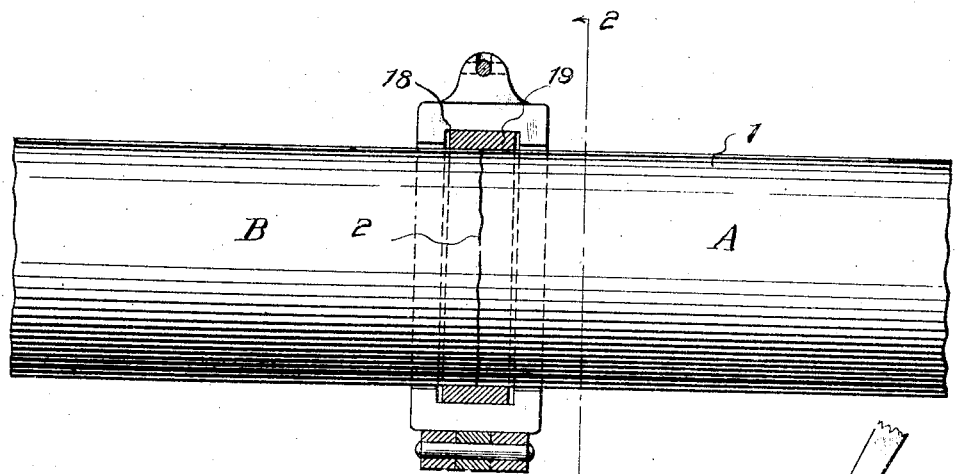
Figure 1 is a side elevation, partly in section with the electrode holder and electrode in position.

Referring now, more particularly, to the drawings 1 indicates a pipe or other tubular article which has been broken at 2 into sections A and B. In this instance the break is substantially a regular one therefore the method and apparatus of the present invention is applicable.

In repairing this break or crack, 2, I provide an electrode holder of appropriate size, the same comprising a clamp having arcuate shaped jaws 3 and 4, hingedly secured together at their lower ends; lugs 5 depending from each of the jaws and carrying pin 6, providing the hinge. Between lugs 5 is a spacer 7, for an obvious purpose.

Secured to the upper end of jaw 3 is a lug 8 to which is pivotally secured a link 9 which is adapted to engage in a slot 10 in a lug 11 carried on the upper end of jaw 4. The outer face 12 of lug 11 is preferably, substantially arcuate in shape to provide a bearing face for a cam surface 13 formed at the foot of a hand lever 14 which is pivotally secured to the free end of link 9 as shown at 15. The end (not shown) of lever 14 is preferably insulated. To make the device symmetrical, the outer face 16 of lug 8 is also arcuate shaped corresponding to face 12 of lug 11.

To each of jaws 3 and 4 is secured a binding post 17 either of which is adapted to receive a lead from a source of electricity. The inner face of each jaw 3 and 4 is recessed as shown at 18, and this recesss is adapted to receive an electrode 19 which may be a single flat strip as shown in Fig. 1 or may be plurality of strips 20 as shown in Fig. 3.

The strip or electrode 19 is inserted in the recess 18 with the jaws 3 and 4 in open position, and the clamp or electrode holder is then placed around the pipe 1 with the electrode 19 in contact with the pipe 1, and over the crack or break 2. This encircling of the pipe by the electrode and electrode holder is, of course, accomplished by closing the jaws 3 and 4, thus bending the electrode, the jaws assuming the position shown in Fig. 2. The link 9 is then dropped into the slot 10 and the handle 14 and link 9 assume the position shown in Fig. 2.

Figure 3:
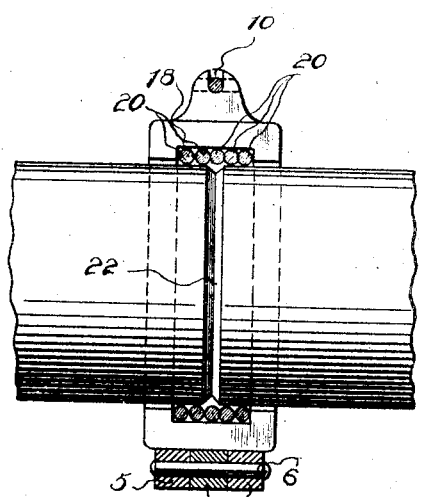
Fig. 3 is a view on the line 3—3 of Fig. 2 showing a plurality of electrodes.

Referring to Fig. 3 wherein is shown what is known as a scarf weld, it will be seen that a plurality of electrodes 20 are held within the recess 18.

Figure 2:
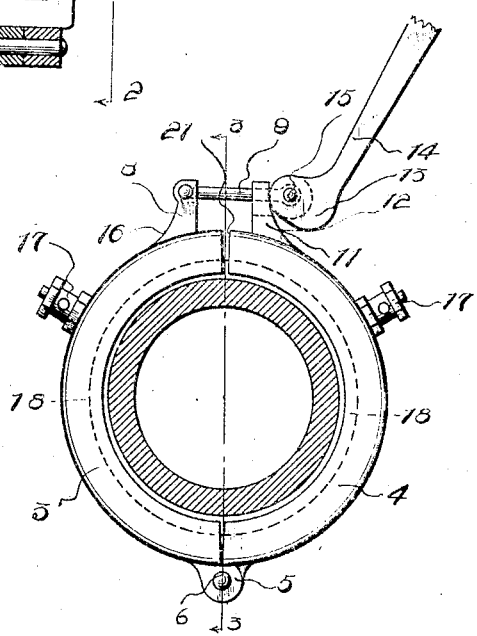
Fig. 2 is a view on the line 2—2, Fig. 1.

It will also be seen that with the elements assembled as above described and as shown in Fig. 2, the upper ends of the jaws 3 and 4 are spaced from each other as shown at 21. The lower end of each of jaws 3 and 4 is tapered for an obvious reason.

In use, the pipe A—B is used as the negative element and the clamp itself is used as the positive element, or if desired the pipe A—B may be positive and the clamp may be negative.

As electrodes or welding material, I preferably use phosphor-bronze as this has been found entirely satisfactory in use, but I am not restricted to the use of phosphor-bronze, as, obviously, other welding material might also give complete satisfaction. The electrode holder may be formed of iron, steel, bronze or copper, or other suitable material depending on the character of the article being welded and the material of which it is formed. Of course it is necessary that the clamp be formed of material such that in operation the welding material will not become united with the clamp, or welded thereto.

With the holder assembled as shown in the drawings, and the binding posts connected to a suitable source of electricity, the electric current is turned on, and it will be apparent that the phosphor-bronze welding material or electrode, whether of the type shown in Figures 1 or 3, will be heated.

The heating is continued until the electrode reaches the fusion point, at which time the handle 14 is depressed, the jaws 3 and 4 being forced together because of the engagement of cam surface 13 with face 12 of lug 11, and the electrode now at the fusion point is positively pressed or forced into the pores of the pipe at the weld or also, referring now to Fig. 3 into the space 22, if a scarf weld is being effected. At this time the electric current is turned off and the weld allowed to cool.

If a scarf or butt weld is being effected, this squeezing of the welding material compensates for any irregularities present in the pipe at the juncture of the sections thereof, which sections are being welded together.

It is believed that the invention will be fully apparent to those skilled in the art, but I desire it understood that various changes in the form and proportions of the device shown may be made within the scope of the appended claims without departing from the spirit of the invention.

What I claim and desire to secure by Letters Patent is:

1. The method of repairing circumferentially cracked or broken tubular structures which comprises covering the crack or break with welding material, heating the welding material, and then compressing the welding material entirely around the tubular structure at one operation until a part at least, enters the pores of the tubular structure.

2. The method of repairing cracked or broken tubular structures which comprises covering the crack or break with welding material, heating the welding material to the fusion point and finally compressing the welding material entirely around the tubular structure at one operation until a part at least is forced into the pores of the tubular structure.

3. The method of electric welding which comprises clamping welding material around the article at the place of weld, heating the welding material to the fusion point and then compressing the welding material to force the same into the pores of the article to be welded.

4. The method of electric welding which comprises clamping welding material around the article at the place of weld, heating the welding material to the fusion point and then compressing the welding material whereby to form a unitary structure of the article welded and the welding material at the place of weld.

5. An article of the kind described comprising a clamp having a recess for receiving welding material and adapted to compress the welding material at the place of weld.

6. A holder for welding material comprising a clamp having arcuate shaped jaws, said jaws being provided with complementary recesses for receiving welding material and being adapted to be forced towards each other to compress the welding material at the place of weld.

7. A holder for welding material comprising oppositely arranged arcuate shaped jaws having complementary recesses for receiving welding material, a hinge connecting said jaws at the lower ends thereof, and a cam lever connected to the jaws at the upper ends thereof for forcing the jaws toward each other to compress the welding material.

8. A holder for welding material comprising oppositely arranged jaws having complementary recesses for receiving welding material, and means for forcing said jaws toward each other to force the welding material into the article being welded into the place of weld.

9. A holder for welding material comprising oppositely arranged arcuate shaped jaws having complementary recesses for receiving welding material, a hinge connecting said jaws at the lower ends thereof, and a cam lever connected to the jaws at the upper ends thereof for forcing the jaws toward each other to compress said welding material, and a binding post secured to each of said jaws.

10. The method of electrically welding together abutting ends of tubular structures which comprises covering the abutting ends with welding material, heating the welding material electrically to the fusion point and compressing the welding material entirely around the tubular structure at the meeting ends in one operation.

11. Electric welding apparatus comprising a clamp having a recess for receiving welding material, said clamp serving as an electrode.

In testimony whereof I affix my signature.

ROYAL MATTICE.